United States Patent
Boudreau et al.

(10) Patent No.: US 11,553,439 B2
(45) Date of Patent: Jan. 10, 2023

(54) ONLINE POWER CONTROL IN D2D NETWORKS

(71) Applicant: Telefonaktiebolaget LM Ericsson (publ), Stockholm (SE)

(72) Inventors: Gary David Boudreau, Kanata (CA); Ben Liang, Whitby (CA); Yujie Xu, Toronto (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/275,806

(22) PCT Filed: Sep. 11, 2019

(86) PCT No.: PCT/IB2019/057649
§ 371 (c)(1),
(2) Date: Mar. 12, 2021

(87) PCT Pub. No.: WO2020/053781
PCT Pub. Date: Mar. 19, 2020

(65) Prior Publication Data
US 2022/0053431 A1     Feb. 17, 2022

Related U.S. Application Data

(60) Provisional application No. 62/730,042, filed on Sep. 12, 2018.

(51) Int. Cl.
*H04W 52/24* (2009.01)
*H04W 52/38* (2009.01)
(52) U.S. Cl.
CPC ....... *H04W 52/243* (2013.01); *H04W 52/383* (2013.01)

(58) Field of Classification Search
CPC .............................................. H04W 52/00–60
See application file for complete search history.

(56) References Cited

U.S. PATENT DOCUMENTS

| | | | | |
|---|---|---|---|---|
| 2014/0086176 A1* | 3/2014 | Liu | ........................ | H04L 5/0057 370/329 |
| 2015/0280893 A1* | 10/2015 | Choi | ........................ | H04L 5/14 370/281 |

(Continued)

OTHER PUBLICATIONS

Song et al., "Resource Allocation for Weighted Sum-Rate Maximization in Multi-User Full-Duplex Device-to-Device Communications: Approaches for Perfect and Statistical CSIs", 2017, IEEE, vol. 5, pp. 27229-27241 (Year: 2017).*

(Continued)

*Primary Examiner* — Raymond S Dean
(74) *Attorney, Agent, or Firm* — Withrow & Terranova, PLLC

(57) ABSTRACT

Embodiments of a method of operation of a power control coordinator to control transmission power of a plurality of Device-to-Device (D2D) pairs that co-exist with a Cellular User Equipment (CUE) that communicates with a base station of a cellular communications network comprises obtaining, for a particular time slot, delayed Network State Information (NSI) feedback from at least some of the plurality of D2D pairs. The method further comprises computing transmission powers for the D2D pairs, respectively, for the particular time slot using On-Line Convex Optimization (OCO) to solve an optimization problem that maximizes a weighted sum data rate of D2D pairs with a constraint of maximum expected interference to the base station. The method further comprises providing, to each D2D pair, an indication of the computed transmission power for the D2D pair for the particular time slot.

13 Claims, 5 Drawing Sheets

(56) References Cited

U.S. PATENT DOCUMENTS

| | | | | |
|---|---|---|---|---|
| 2015/0351089 | A1* | 12/2015 | Li | H04W 52/267 |
| | | | | 455/426.1 |
| 2016/0044486 | A1* | 2/2016 | Pais | H04W 8/005 |
| | | | | 370/252 |
| 2016/0302172 | A1* | 10/2016 | Phan | H04L 1/0009 |
| 2017/0332376 | A1* | 11/2017 | He | H04L 5/18 |
| 2018/0077653 | A1* | 3/2018 | Boudreau | H04W 76/14 |

OTHER PUBLICATIONS

Afzal, Asma et al., "On the Analysis of Cellular Networks with Caching and Coordinated Device-to-Device Communication," in Proc. IEEE International Conference on Communications, May 2016, 7 pages.

Amin, Belal S., et al., "Power Allocation for Device-to-Device Communication Underlaying Massive MIMO Multicasting Networks," IEEE Wireless Communications and Networking Conference (WCNC), New Orleans, USA, 2015, pp. 1219-1224.

Bao, Wei et al., "Rate Maximization Through Structured Spectrum Allocation and User Association in Heterogeneous Cellular Networks," IEEE Transactions on Communications, vol. 63, No. 11, Nov. 2015, pp. 4510-4524.

Bastug, Ejder et al., "Living on the Edge: The Role of Proactive Caching in 5G Wireless Networks," IEEE Communications Magazine, vol. 52, No. 8, Aug. 2014, pp. 82-89.

Blaszczyszyn, Bartlomiej et al., "Optimal Geographic Caching in Cellular Networks," in Proc. IEEE International Conference on Communications, Jun. 2015, pp. 3358-3363.

Chae, Seong Ho et al., "Caching Placement in Stochastic Wireless Caching Helper Networks: Channel Selection Diversity via Caching," IEEE Transactions on Wireless Communications, vol. 15, No. 10, Oct. 2016, pp. 6626-6637.

Chae, Seong Ho et al., "Cooperative Transmission via Caching Helpers," in Proc. IEEE Global Communications Conference, Dec. 2015, 6 pages.

Chen, Bingqiang et al.,"Cache-Enabled Device-to-Device Communications: Offloading Gain and Energy Cost," IEEE Transactions on Wireless Communications, vol. 16, No. 7, Jul. 2017, pp. 4519-4536.

Chen, Zhang et al., "D2D Caching vs. Small Cell Caching: Where to Cache Content in a Wireless Network?" in Proc. IEEE International Workshop on Signal Processing Advances in Wireless Communications, Jul. 2016, 6 pages.

Chen, Zheng et al., "Probabilistic Caching in Wireless D2D Networks: Cache Hit Optimal Versus Throughput Optimal," IEEE Communications Letters, vol. 21, No. 3, Mar. 2017, pp. 584-587.

Dai, Binbin et al., "Joint User Association and Content Placement for Cache-Enabled Wireless Access Networks," in Proc. IEEE International Conference on Acoustics, Speech and Signal Processing (ICASSP), Mar. 2016, pp. 3521-3525.

Golrezaei, Negin et al., "Wireless Device-to-Device Communications with Distributed Caching," in Proc. IEEE International Symposium on Information Theory, Jul. 2012, pp. 2781-2785.

Guo, Yinghao et al., "Cooperative Local Caching Under Heterogeneous File Preferences," IEEE Transactions on Communications, vol. 65, No. 1, Jan. 2017, pp. 444-457.

Ji, Mingyue et al., "The Throughput-Outage Tradeoff of Wireless One-Hop Caching Networks," IEEE Transactions on Information Theory, vol. 61, No. 12, Dec. 2015, pp. 6833-6859.

Ji, Mingyue et al.,"Wireless Device-to-Device Caching Networks: Basic Principles and System Performance," IEEE Journal on Selected Areas in Communications, vol. 34, No. 1, Jan. 2016, pp. 176-189.

Jo, Han-Shin et al. "Heterogeneous Cellular Networks with Flexible Cell Association: A Comprehensive Downlink SINR Analysis," IEEE Transactions on Wireless Communications, vol. 11, No. 10, Oct. 2012, pp. 3484-3495.

Krishnan, Shankar et al., "Distributed Caching in Device-to-Device Networks: A Stochastic Geometry Perspective," in Proc. Asilomar Conference on Signals, Systems and Computers, Nov. 2015, pp. 1280-1284.

Li, Song, et al., "Resource Allocation for Weighted Sum-Rate Maximization in Multi-User Full-Duplex Device-to-Device Communications: Approaches for Perfect and Statistical CSIs," IEEE Access, vol. 5, Sep. 11, 2017, pp. 27229-27241.

Lin, Xingqin et al., "Spectrum Sharing for Device-to-Device Communication in Cellular Networks," IEEE Transactions on Wireless Communications, vol. 13, No. 12, Dec. 2014, pp. 6727-6740.

Lin, Yicheng et al., "Optimizing User Association and Spectrum Allocation in HetNets: A Utility Perspective," IEEE Journal on Selected Areas in Communications, vol. 33, No. 6, Jun. 2015, pp. 1025-1039.

Liu, Jiajia et al., "Device-to-Device Communication in LTE-Advanced Networks: A Survey," IEEE Communications Surveys & Tutorials, vol. 17, No. 4, 2015, pp. 1923-1940.

Malak, Derya et al., "Optimizing Content Caching to Maximize the Density of Successful Receptions in Device-to-Device Networking," IEEE Transactions on Communications, 2016, 32 pages, URL: https://arxiv.org/abs/1608.07857.

Malak, Derya et al., "Spatially Correlated Content Caching for Device-to-Device Communications," IEEE Transactions on Wireless Communications, vol. 17, No. 1, Jan. 2018, pp. 56-70.

Poularakis, Konstantinos et al., "Caching and Operator Cooperation Policies for Layered Video Content Delivery," IEEE International Conference on Computer Communications, Apr. 2016, 9 pages.

Poularakis, Konstantinos et al., "Video Delivery over Heterogeneous Cellular Networks: Optimizing Cost and Performance," in IEEE Conference on Computer Communications, Apr. 2014, pp. 1078-1086.

Rao, Jun et al., "Optimal Caching Placement for D2D Assisted Wireless Caching Networks," in Proc. IEEE International Conference on Communications, May 2016, 6 pages.

Shanmugam, Karthikeyan et al., "FemtoCaching: Wireless Content Delivery Through Distributed Caching Helpers," IEEE Transactions on Information Theory, vol. 59, No. 12, Dec. 2013, pp. 8402-8413.

Wang, Yue et al., "Cooperative Caching Placement in Cache-Enabled D2D Underlaid Cellular Network," IEEE Communications Letters, vol. 21, No. 5, May 2017, pp. 1151-1154.

Zhu, Kun et al., "Joint Mode Selection and Spectrum Partitioning for Device-to-Device Communication: A Dynamic Stackelberg Game," IEEE Transactions on Wireless Communications, vol. 14, No. 3, Mar. 2015, pp. 1406-1420.

International Search Report and Written Opinion for International Patent Application No. PCT/IB2019/057649, dated Dec. 20, 2019, 14 pages.

Written Opinion for International Patent Application No. PCT/IB2019/057649, dated Nov. 18, 2020, 6 pages.

International Preliminary Report on Patentability for International Patent Application No. PCT/IB2019/057649, dated Jan. 27, 2021, 23 pages.

Examination Report for European Patent Application No. 19787424. 1, dated Apr. 13, 2022, 7 pages.

\* cited by examiner

ONLINE POWER CONTROL IN D2D NETWORKS

RELATED APPLICATIONS

This application is a 35 U.S.C. § 371 national phase filing of International Application No. PCT/IB2019/057649, filed Sep. 11, 2019, which claims the benefit of provisional patent application serial number 62/730,042, filed Sep. 12, 2018, the disclosures of which are hereby incorporated herein by reference in their entireties.

TECHNICAL FIELD

The present disclosure relates to power control in a wireless Device-to-Device (D2D) network.

BACKGROUND

It is expected that there will be 50 billion connected devices by 2020 [1]. Hence, direct communication among devices, i.e., Device-to-Device (D2D) communication has been considered as an important way to further increase throughput in Fifth Generation (5G) networks. In one of the typical D2D communication scenarios, D2D pairs reuse spectrum with Cellular User Equipment (CUE) in order to improve spectrum efficiency. Despite the potential benefit of D2D communication, it introduces interference to the cellular network. Hence, one important problem in D2D communication is how to coordinate transmission power among D2D pairs to improve D2D transmission rate while maintaining good performance for CUEs.

SUMMARY

Systems and methods for controlling transmission power of Device-to-Device (D2D) pairs that co-exist with a Cellular User Equipment (CUE) that communicates with a base station of a cellular communications network are disclosed. In some embodiments, a method of operation of a power control coordinator to control transmission power of a plurality of D2D pairs that co-exist with a CUE that communicates with a base station of a cellular communications network comprises obtaining, for a particular time slot, delayed Network State Information (NSI) feedback from at least some of the plurality of D2D pairs. The method further comprises computing transmission powers for the D2D pairs, respectively, for the particular time slot using On-Line Convex Optimization (OCO) to solve an optimization problem that maximizes a weighted sum data rate of D2D pairs with a constraint of maximum expected interference to the base station. The method further comprises providing, to each D2D pair, an indication of the computed transmission power for the D2D pair for the particular time slot.

In some embodiments, obtaining the delayed NSI feedback from the at least some of the plurality of D2D pairs comprises obtaining the delayed NSI feedback from all of the plurality of D2D pairs. Further, in some embodiments, the optimization problem is:

$$\tilde{\mathcal{P}}: \max_{\{p(t)\}} \sum_{i=1}^{N} \tilde{\theta}_i(t) p_i(t) - \alpha (p_i(t) - p_i(t-1)^*)^2$$

s.t. $p_{i,min} \leq p_i(t) \leq p_{i,max}, \forall i \in \mathcal{N}$, $$\sum_{i=1}^{N} G_i p_i(t) \leq I_{max}^C, \text{ where}$$

$$\tilde{\theta}_i(t) = \sum_{j=1}^{N} \frac{\partial f_{j,t}(p(t-D))}{\partial p_i(t-D)} \Big|_{p(t-D) = p(t-D)^*}$$

and:
- $\tilde{\mathcal{P}}$ denotes the optimization problem,
- $p_i(t)$ is a transmission power of a D2D transmitter of the i-th D2D pair for time slot t,
- $\alpha$ is a defined scaling factor,
- $p_{i,min}$ is a minimum transmission power of the D2D transmitter of the i-th D2D pair,
- $p_{i,max}$ is a maximum transmission power of the D2D transmitter of the i-th D2D pair,
- $\mathcal{N}$ is the set of i values for the plurality of D2D pairs,
- $G_i = \mathbb{E}[g_i(t)]$ where $g_i(t)$ is a channel gain from the D2D transmitter of the i-th D2D pair to the base station for time slot t,
- $I_{max}^c$ is a restraint on a maximum expected interference power from the plurality of D2D pairs to the base station,
- t−D is a starting time slot index,
- $p(t)^* = [p(t)^*]$ denotes an optimal solution to the optimization problem it for all t, and
- $f_{j,t-D}(p(t-D)) = w_j \tilde{R}_{j,(t-D)}$, where $w_j$ is a weight assigned to the j-th D2D pair and:

$$\tilde{R}_{i,t} = \log\left(\sum_{j=1, j\neq i}^{N} p_j(t) h_{ij}(t) + I_i(t) + \Gamma p_i(t) h_{ii}(t)\right) - \log(I_i(t)) - \frac{\sum_{j=1, j\neq i}^{N} h_{ij}(t) p_j(t)}{I_i(t)}$$

where:
- $h_{ij}(t)$ is a channel gain from a D2D transmitter of the j-th D2D pair to a D2D receiver of the i-th D2D pair in time slot t,
- $I_i(t)$ is a sum power of inter-cell interference, interference from the CUE, and noise received by the i-th D2D pair in time slot t,
- $\Gamma$ accounts for a gap between an actual data rate and the Shannon bound, and
- $h_{ii}(t)$ is a channel gain from a D2D transmitter of the i-th D2D pair to a D2D receiver of the i-th D2D pair in time slot t.

In some embodiments, obtaining the delayed NSI feedback from the at least some of the plurality of D2D pairs comprises obtaining the delayed NSI feedback from a limited subset of the plurality of D2D pairs. Further, in some embodiments, the optimization problem is:

$$\tilde{\mathcal{P}}_t: \max_{p(t)} \sum_{i=1}^{N} \tilde{\theta}_i(t) p_i(t) - \alpha (p_i(t) - p(t-1)^*)^2$$

s.t. $p_{i,min} \leq p_i(t) \leq p_{i,max}, \forall i \in \mathcal{N}$, $$\sum_{i=1}^{N} G_i p_i(t) \leq I_{max}^C, \text{ where}$$

-continued $$\bar{\theta}_i(t) = \sum_{j \in \mathcal{J}_{t-D}} \frac{1}{P_j} \frac{\partial f_{j,t-D}(p(t-D))}{\partial p_i(t-D)} \Big|_{p(t-D)=p(t-D)^*}$$

and:

$\bar{\mathcal{P}}_t$ denotes the optimization problem, $p_i(t)$ is a transmission power of a D2D transmitter of the i-th D2D pair for time slot t, $\alpha$ is a defined scaling factor, $p_{i,min}$ is a minimum transmission power of the D2D transmitter of the i-th D2D pair, $p_{i,max}$ is a maximum transmission power of the D2D transmitter of the i-th D2D pair, $\mathcal{N}$ is the set of i values for the plurality of D2D pairs, $G_i = \mathbb{E}[g_i(t)]$ where $g_i(t)$ is a channel gain from the D2D transmitter of the i-th D2D pair to the base station for time slot t, $I_{max}^c$ is a restraint on a maximum expected interference power from the plurality of D2D pairs to the base station, t–D is a starting time slot index, $\mathcal{J}_{t-D}$ is a set of indices of the limited subset of the plurality of D2D pairs;

$P_j = \sum_{j \in \mathcal{J}_j} P_j$ where, $\mathcal{J} \in \mathcal{J}_{t-D}$ and $\sum_{J \in \mathcal{J}} P_J = 1$, $p(t)^* = [p(t)^*]$ denotes an optimal solution to the optimization problem $\bar{\mathcal{P}}_0$ for all t, and $f_{j,t-D}(p(t-D)) = w_j \tilde{R}_{j,(t-D)}$, where $w_j$ is a weight assigned to the j-th D2D pair and:

$$\tilde{R}_{i,t} = \log\left(\sum_{j=1,j\neq i}^{N} p_j(t)h_{ij}(t) + I_i(t) + \Gamma p_i(t)h_{ii}(t)\right) - \log(I_i(t)) - \frac{\sum_{j=1,j\neq i}^{N} h_{ij}(t)p_j(t)}{I_i(t)}$$

where:

$h_{ij}(t)$ is a channel gain from a D2D transmitter of the j-th D2D pair to a D2D receiver of the i-th D2D pair in time slot t, $I_i(t)$ is a sum power of inter-cell interference, interference from the CUE, and noise received by the i-th D2D pair in time slot t, $\Gamma$ accounts for a gap between an actual data rate and the Shannon bound, and $h_{ii}(t)$ is a channel gain from a D2D transmitter of the i-th D2D pair to a D2D receiver of the i-th D2D pair in time slot t.

In some embodiments, the method is implemented in a network node of the cellular communications network.

Embodiments of the network node that implements a power control coordinator for controlling transmission power of a plurality of D2D pairs that co-exist with a CUE that communicates with a base station of a cellular communications network are also disclosed. In some embodiments, the network node comprises processing circuitry operable to cause the network node to obtain, for a particular time slot, delayed NSI feedback from at least some of the plurality of D2D pairs. The processing circuitry is further operable to cause the network node to compute transmission powers for the D2D pairs, respectively, for the particular time slot using OCO to solve an optimization problem that maximizes a weighted sum data rate of D2D pairs with a constraint of maximum expected interference to the base station. The processing circuitry is further operable to cause the network node to provide, to each D2D pair, an indication of the computed transmission power for the D2D pair for the particular time slot.

In some embodiments, the processing circuitry is operable to cause the network node to obtain the delayed NSI feedback from all of the plurality of D2D pairs. In some embodiments, the optimization problem is:

$$\tilde{\mathcal{P}}_t : \max_{\{p(t)\}} \sum_{i=1}^{N} \tilde{\theta}_i(t)p_i(t) - \alpha(p_i(t) - p_i(t-1)^*)^2$$

s.t. $p_{i,min} \leq p_i(t) \leq p_{i,max}, \forall i \in \mathcal{N}$, $\sum_{i=1}^{N} G_i p_i(t) \leq I_{max}^C$, where $$\tilde{\theta}_i(t) = \sum_{j=1}^{N} \frac{\partial f_{j,t}(p(t-D))}{\partial p_i(t-D)} \Big|_{p(t-D)=p(t-D)^*}$$

and:

$\tilde{\mathcal{P}}$ denotes the optimization problem, $p_i(t)$ is a transmission power of a D2D transmitter of the i-th D2D pair for time slot t, $\alpha$ is a defined scaling factor, $p_{i,min}$ is a minimum transmission power of the D2D transmitter of the i-th D2D pair, $p_{i,max}$ is a maximum transmission power of the D2D transmitter of the i-th D2D pair, $\mathcal{N}$ is the set of i values for the plurality of D2D pairs, $G_i = \mathbb{E}[g_i(t)]$ where $g_i(t)$ is a channel gain from the D2D transmitter of the i-th D2D pair to the base station for time slot t, $I_{max}^c$ is a restraint on a maximum expected interference power from the plurality of D2D pairs to the base station, $\tilde{\mathcal{P}}$ t–D is a starting time slot index, $p(t)^* = [p(t)^*]$ denotes an optimal solution to the optimization problem $\tilde{\mathcal{P}}_t$ for all t, and $f_{j,t-D}(p(t-D)) = w_j \tilde{R}_{j,(t-D)}$, where $w_j$ is a weight assigned to the j-th D2D pair and:

$$\tilde{R}_{i,t} = \log\left(\sum_{j=1,j\neq i}^{N} p_j(t)h_{ij}(t) + I_i(t) + \Gamma p_i(t)h_{ii}(t)\right) - \log(I_i(t)) - \frac{\sum_{j=1,j\neq i}^{N} h_{ij}(t)p_j(t)}{I_i(t)}$$

where:

$h_{ij}(t)$ is a channel gain from a D2D transmitter of the j-th D2D pair to a D2D receiver of the i-th D2D pair in time slot t, $I_i(t)$ is a sum power of inter-cell interference, interference from the CUE, and noise received by the i-th D2D pair in time slot t, $\Gamma$ accounts for a gap between an actual data rate and the Shannon bound, and $h_{ii}(t)$ is a channel gain from a D2D transmitter of the i-th D2D pair to a D2D receiver of the i-th D2D pair in time slot t.

In some embodiments, the processing circuitry is operable to cause the network node to obtain the delayed NSI feedback from a limited subset of the plurality of D2D pairs. In some embodiments, the optimization problem is:

$$\overline{\mathcal{P}}_t : \max_{p(t)} \sum_{i=1}^{N} \overline{\theta}_i(t) p_i(t) - \alpha(p_i(t) - p(t-1)^*)^2$$

$$\text{s.t. } p_{i,min} \le p_i(t) \le p_{i,max}, \forall i \in \mathcal{N},$$

$$\sum_{i=1}^{N} G_i p_i(t) \le I_{max}^C, \text{ where}$$

$$\overline{\theta}_i(t) = \sum_{\mathcal{H}_{t-D}} \frac{1}{P_j} \frac{\partial f_{j,t-D}(p(t-D))}{\partial p_i(t-D)} |_{p(t-D)=p(t-D)^*}$$

$\overline{\mathcal{P}}_t$ denotes the optimization problem, $p_i(t)$ is a transmission power of a D2D transmitter of the i-th D2D pair for time slot t, α is a defined scaling factor, $p_{i,min}$ is a minimum transmission power of the D2D transmitter of the i-th D2D pair, $p_{i,max}$ is a maximum transmission power of the D2D transmitter of the i-th D2D pair, $\mathcal{N}$ is the set of i values for the plurality of D2D pairs, $G_i = \mathbb{E}[g_i(t)]$ where g(t) is a channel gain from the D2D transmitter of the i-th D2D pair to the base station for time slot t, $I_{max}^c$ is a restraint on a maximum expected interference power from the plurality of D2D pairs to the base station, t−D is a starting time slot index, $\mathcal{I}_{t-D}$ is a set of indices of the limited subset of the plurality of D2D pairs;

$P_j = \sum_{\mathcal{I} \in \mathcal{I}_i} P_\mathcal{I}$ where $\mathcal{I} \in \mathcal{I}_{t-D}$ and $\sum_{\mathcal{I} \in \mathcal{I}} P_\mathcal{I} = 1$, p(t)*=[p(t)*] denotes an optimal solution to the optimization problem $\overline{P}_t$ for all t, and $f_{j,t-D}(p(t-D)) = w_j \tilde{R}_{j,(t-D)}$, where $w_j$ is a weight assigned to the j-th D2D pair and:

$$\tilde{R}_{i,t} = \log\left(\sum_{j=1, j \ne i}^{N} p_j(t) h_{ij}(t) + I_i(t) + \Gamma p_i(t) h_{ii}(t)\right) - \log(I_i(t)) - \frac{\sum_{j=1, j \ne i}^{N} h_{ij}(t) p_j(t)}{I_i(t)}$$

where:

$h_{ij}(t)$ is a channel gain from a D2D transmitter of the j-th D2D pair to a D2D receiver of the i-th D2D pair in time slot t, $I_i(t)$ is a sum power of inter-cell interference, interference from the CUE, and noise received by the i-th D2D pair in time slot t, Γ accounts for a gap between an actual data rate and the Shannon bound, and $h_{ii}(t)$ is a channel gain from a D2D transmitter of the i-th D2D pair to a D2D receiver of the i-th D2D pair in time slot t.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
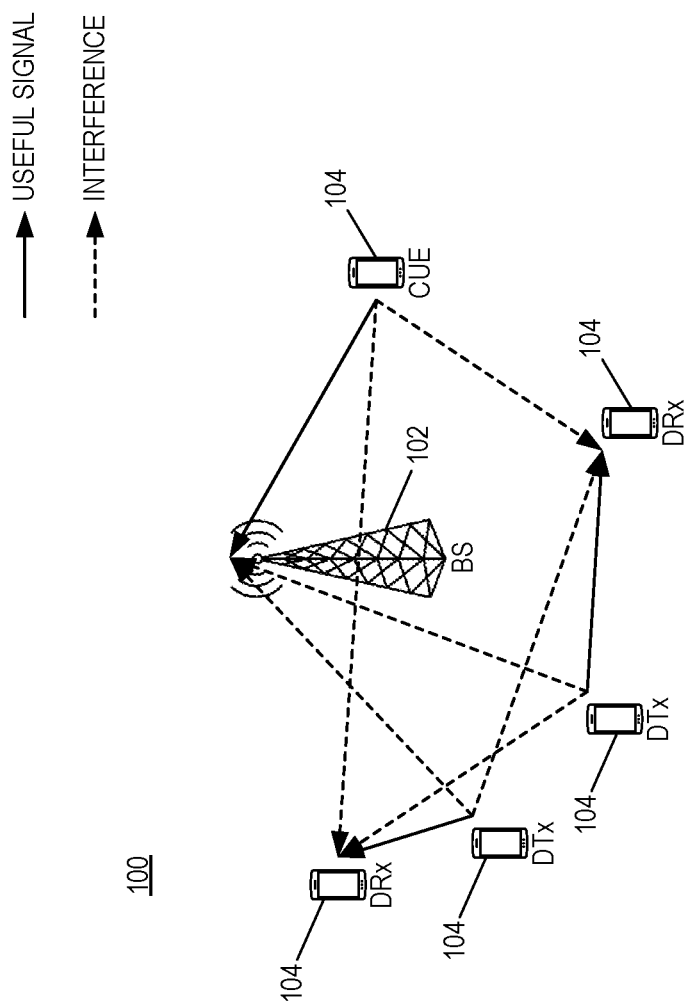
FIG. 1 illustrates one example of a wireless system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

The present disclosure comprises embodiments which can be implemented in multiple devices and network nodes able to perform scheduling and exchange information. The devices are capable of direct communication between devices (e.g., Device-to-Device (D2D) communication). The network node herein can be the serving network node of the device or any network node with which the device can establish or maintain a communication link and/or receive information (e.g., via a broadcast channel).

The embodiments use a generic term 'network node' that may be any kind of network node. Examples are enhanced or evolved Node B (eNB), Node B, Base Station (BS), wireless Access Point (AP), BS controller, radio network controller, relay, donor node controlling relay, Base Transceiver Station (BTS), transmission points, transmission nodes, Remote Radio Unit (RRU), Remote Radio Head (RRH), nodes in a Distributed Antenna System (DAS), a core network node, a Mobility Management Entity (MME), etc.

The embodiments also use a generic term 'device.' However, a device can be any type of wireless equipment, which is capable of at least communication through wireless communication (including D2D communication). Examples of such devices are a sensor, a modem, a smart phone, a Machine Type Communication (MTC) device aka Machine-to-Machine (M2M) device, a Personal Digital Assistant (PDA), an iPad, a tablet, a smart phone, Laptop Embedded Equipment (LEE), Laptop Mounted Equipment (LME), Universal Serial Bus (USB) dongles, etc.

Although terminology from Third Generation Partnership Project (3GPP) Long Term Evolution (LTE) Advanced (LTE-A) (or Evolved Universal Terrestrial Radio Access Network (E-UTRAN)) has been used in this disclosure to exemplify the present disclosure, this should not limit the scope of the present disclosure to only the aforementioned system. Other wireless systems, including New Radio (NR), LTE, Wideband Code Division Multiple Access (WCDMA), Universal Terrestrial Radio Access (UTRA) Frequency Division Duplexing (FDD), UTRA Time Division Duplexing (TDD), and Global System for Mobile Communications (GSM)/GSM Communications Enhanced Data Rates for GSM (EDGE) Evolution Radio Access Network (GERAN)/EDGE, may also benefit from exploiting the ideas covered within this disclosure.

As discussed in the Background section, one important problem in D2D communication is how to coordinate transmission power among D2D pairs to improve D2D transmission rate while maintaining good performance for Cellular User Equipments (CUEs). Various power control schemes in different scenarios have been proposed in [2]-[10]. These works all assume that the instantaneous Channel State Information (CSI) is provided by the network coordinators. However, there exist many sources of delay in the network, for instance, CSI feedback delay from the devices to the power control coordinators, processing delay in the coordinators, and delay of sending power control decisions from the coordinators to the devices. Therefore, the delayed CSI received by the coordinators may be inconsistent with the current CSI. Especially in high-mobility networks, the delayed CSI may be independent of the current CSI.

There are different ways to exploit the delayed CSI in existing works. For instance, [11]-[17] adopt special channel models to predict the instantaneous CSI based on the delayed CSI. However, there are several disadvantages regarding this approach, namely: 1) the imprecision of the channel model in different scenarios and 2) the requirement of prior statistical information of the channel model. These disadvantages can be overcome by employing an on-line convex learning approach [18].

The authors of [19]-[22] adopt the on-line convex learning method to solve power control problems in a wireless network. However, these works focus on improving the performance of a single User Equipment (UE) by treating the interference from other UEs as noise and neglecting the benefit of coordination among UEs. Furthermore, due to the large number of devices in the network, acquiring the CSI of all UEs may not be possible in some cases. Hence, it is meaningful to consider power control with limited delayed CSI feedback. It is noted that the authors of [23], [24] provide several approaches of convex learning with limited feedback. However, their objectives are limited to a square loss function.

In the present disclosure, maximizing a weighted sum rate with delayed Network State Information (NSI) feedback is considered. Further, a maximum interference constraint is imposed on the transmission power of all the D2D pairs in order to guarantee the performance of CUEs.

There are works considering power control in D2D networks with the restriction that a sub-channel can be reused by at most one CUE and one D2D pair. A simple binary power control method is proposed in [2] to maximize the utility in D2D communication, where all the D2D pairs, CUEs, and BSs are equipped with one single antenna. The authors of [3] further consider the objective consisting of a logarithm utility of rate and transmission power cost. The authors of [4] aim at maximizing the energy efficiency of the D2D pairs with a Quality of Service (QoS) guarantee for both D2D pairs and CUEs. The authors of [5] further consider the sum rate maximization in the case of multiple antennas and the constraint of maximum interference to other nodes.

References [6]-[10] consider power control in D2D networks where multiple D2D pairs are allowed to reuse one sub-channel with one CUE. The authors of [6] jointly optimize the transmission power and channel allocation to maximize the sum rate, while the authors of [8] focus on the objective of energy efficiency maximization. The authors of [7] aim at minimizing the sum of transmission power of all the D2D pairs with a QoS guarantee for D2D pairs and CUEs. Joint user association and power control to maximize the weighted sum rate is studied in [9]. Furthermore, the authors of [10] consider maximizing the ergodic sum rate with the probabilistic outage constraint and long-term averaged power constraint.

There currently exist certain challenge(s) as noted below.

The algorithms proposed in [2]-[10] assume that the coordinator acquires instantaneous CSI information when determining the transmission power of devices in the network. Hence, their solutions are not applicable to the scenario of delayed CSI.

In [11]-[15], the authors adopt the simple channel state prediction model, $h_{current} = \rho h_{delayed} + \sqrt{1-\rho^2} w$ to predict the current channel state $h_{current}$ according to the delayed channel state $h_{delayed}$, where $\rho$ is a correlation coefficient and w is modeled as a circularly symmetric complex Gaussian random variable. The correlation between the current and the delayed channel states has a great impact on the performance of their proposed schemes. Other works like [16], [17] model the channel state as a finite state Markov Chain and consider the expected throughput in the current time slot based on the transition probabilities and the delayed channel states. In these works, their proposed schemes depend on special assumptions on the channel and the statistics related to the channel model.

Another approach to exploit the delayed CSI in a wireless network is On-Line Convex Optimization (OCO). The advantage of OCO is that neither an assumption on the channel nor any prior information about its statistics is required. OCO has been applied to power control problems in wireless networks with delayed CSI feedback. For instance, [19] studies the problem of maximizing a single user's utility in a Multiple Input Multiple Output (MIMO) network. The authors of [20] further consider maximizing the energy efficiency in a MIMO Orthogonal Frequency Division Multiplexing (OFDM) system. The authors of [21] consider power control with the long term averaged power constraint in a point to point MIMO network. Furthermore, the authors of [22] consider maximizing the utility in the scenario where transmission power is harvested from the environment and stored in a battery of limited capacity. All these problems do not consider power coordination among different UEs.

Some effort has been put into the study of the OCO problems where only limited information of the objective function is available.

One class of such problems is the Bandit Convex Optimization (BCO) problem. In the BCO problem, the feedback is the value of the objective function at some selected points. In one of the simplest BCO models, a Multi-Armed Bandit (MAB) optimization problem, the decision in each iteration is the probability of taking some fixed actions, and the loss function is the expected loss. The feedback to the decision maker is the loss of one fixed action. Different algorithms have been developed for these problems based on different assumptions of the loss function [25]-[28]. The problem studied by the present inventors differs from these works in that the limited feedback information in the present problem is the parameters of the objective function rather than the value of the objective at some points in [25]-[28].

Another class of problems studied is linear regression with limited observations. In these problems, the decision maker only knows a part of the parameters regarding the objective function when making decisions. The algorithm proposed in [23] guarantees $\sqrt{T}$ regret bound. Furthermore, the authors of [24] propose an algorithm which exploits the distribution of the parameters in the objective function to further tighten the regret bound. However, these works focus on the specific square loss function, which does not apply to the present problem.

Certain aspects of the present disclosure and their embodiments may provide solutions to the aforementioned or other challenges.

The present disclosure comprises the following embodiments to design power control among D2D pairs in order to maximize the weighted sum rate with the delayed NSI. The present disclosure includes the following two embodiments:

First Embodiment: A power control method is provided with full NSI feedback. In this method, the original problem is recast into per-time slot problems via a convexification technique and on-line gradient method.

Second Embodiment: A power control method is provided with limited NSI feedback. In each time slot, D2D pairs are randomly selected to send their local NSI to a power control coordinator.

Certain embodiments may provide one or more of the following technical advantage(s). For example, the disclosed embodiments do not require the prior statistical information of the network information and can generate a performance guarantee solution.

FIG. 1 illustrates one example of a wireless system 100 in which embodiments of the present disclosure may be implemented. As illustrated, the wireless system 100 includes a BS 102 of a cellular communications network (e.g., an LTE or Fifth Generation (5G) NR network) and a number of wireless devices 104, which are also referred to herein as 'devices.' The devices 104 include, in this example, a CUE that communicates with the base station 102 and other wireless devices that form multiple D2D pairs. The D2D pairs co-exist with the CUE.

Each D2D pair consists of one D2D transmitter (DTx) and one D2D receiver (DRx). N={1, ..., N} denotes the set of all the D2D pairs in the network. All D2D pairs reuse one channel with the CUE. Power control of these D2D pairs is the focus of the present discussion. For simplicity, the bandwidth of the channel is normalized to one. Further, all the D2D pairs are assumed to be equipped with one antenna.

Time is slotted. The transmission power of DTx i in time slot t is $p_i(t)$. The channel gain from DTx j to DRx i in time slot t is $h_{ij}(t)$. The channel gain from DTx j to BS in time slot t is $g_j(t)$. Furthermore, $I_i(t)$ is the sum power of inter-cell interference, interference from the CUE, and noise received by D2D pair i in time slot t. Let $\mathfrak{N}(t)=$ $$\left\{\{h_{ij}(t)\}_{i=1, j=1}^{i=N, j=N}, \{I_i(t)\}_{i=1}^{i=N}\right\}$$

be the full NSI in time slot t, and let $\mathfrak{N}_i((t))=$ $$\left\{\{h_{ij}(t)\}_{j=1}^{j=N}, I_i(t)\right\}$$

be the local NSI for D2D pair i. It is further assumed that there exists positive and finite $h_{max}$, $I_{min}$, and $I_{max}$, such that $0 < h_{ij}(t) < h_{max}$, and $I_{min} < I_i(t) < I_{max}$ for any i, j, and t.

Thus, the data rate of D2D pair i in time slot t is given by $$R_{i,t} = \log\left(1 + \Gamma \frac{p_i(t)h_{ii}(t)}{I_i(t) + \sum_{j=1, j \neq i} p_j(t)h_{ij}(t)}\right)$$

where $\Gamma$ accounts for the gap between the actual rate and the Shannon bound.

It is assumed that there is a power control coordinator in the network that controls the transmission power of all the D2D pairs in each time slot. The coordinator may be implemented at the BS 102 or some elected D2D pair(s). Furthermore, there is a delay of D(D≥1) time slots in the feedback of NSI to the coordinator. Note that for notational convenience, it is assumed that the index of the time slot starts from −D, and the collection of time slots is {−D, −D+1, −D+2, ..., T}.

In this disclosure, the focus is on maximizing the weighted sum rate of D2D pairs with the constraint of maximum expected interference to the BS.

Therefore, the optimization problem is formulated as $$\mathcal{P}: \max_{\{p(t)\}} \lim_{T \to \infty} \frac{1}{T} \sum_{t=1}^{T} \sum_{i=1}^{N} w_i R_{i,t}$$

$$\text{s.t. } p_{i,min} \leq p_i(t) \leq p_{i,max}, \forall i \in \mathcal{N}, 1 \leq t \leq T,$$

$$\sum_{i=1}^{N} G_i p_i(t) \leq I_{max}^C,$$

where $w_i$ is the weight of D2D pair i in the objective, $G_i$ is expected channel gain between DTx i and the BS, and $p(t)=[p_i(t)]_{1 \times N}$ It is assumed that $\{g_i(t)\}$ are stationary random processes for all D2D pairs, and let $G_i=\mathbb{E}[g_i(t)]$. In the first constraint, the transmission power of D2D pair i is bounded by $p_{i,min}$ and $p_{i,max}$. The second constraint is the interference constraint restricting that the expected interference power from the D2D pairs to the BS cannot exceed $I_{max}^c$.

The challenge in problem P is that in time slot t, the current NSI, i.e., $\mathfrak{N}(t)$, is not available. We resort to the tool of OCO to solve problem $\mathcal{P}$.

Figure 2:
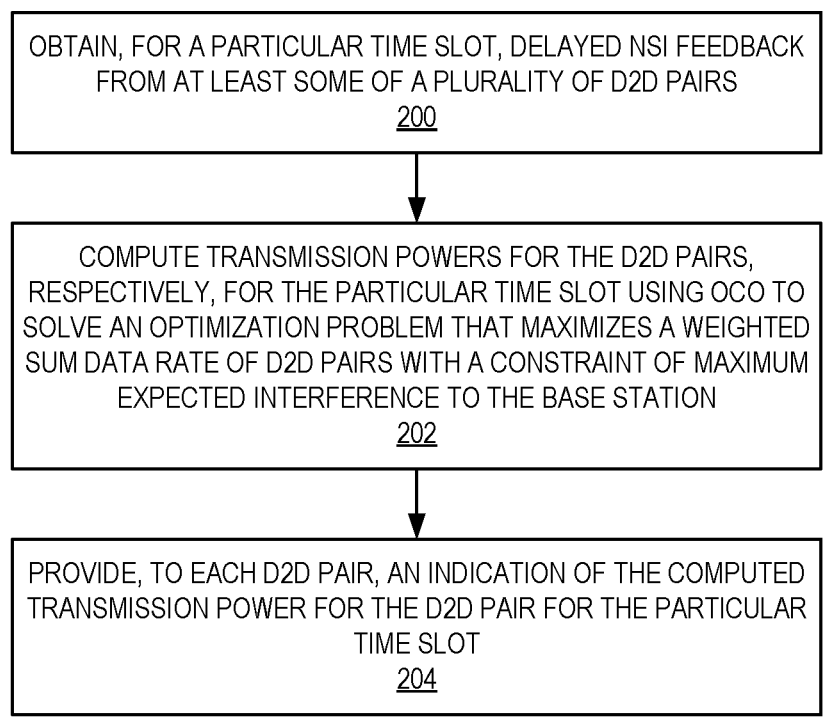
FIG. 2 is a flow chart that illustrates the operation of a power control coordinator to solve the optimization problem using On-Line Convex Optimization (OCO) in accordance with at least some embodiments of the present disclosure.

In this regard, FIG. 2 is a flow chart that illustrates the operation of a power control coordinator to solve the optimization problem using OCO in accordance with at least some embodiments of the present disclosure. As illustrated, in order to control transmission power of multiple D2D pairs that coexist with a CUE that communicates with a BS of a cellular communications network, the power control coordinator obtains, for a particular time slot, delayed NSI feedback from at least some of a plurality of D2D pairs (step 200). The power control coordinator computes transmission powers for the D2D pairs, respectively, for the particular time slot using OCO to solve an optimization problem that maximizes a weighted sum data rate of D2D pairs with a constraint on the maximum expected interference to the BS (step 202). The power control coordinator provides, to each D2D pair, an indication of the computed transmission power for the D2D pair for the particular time slot (step 204).

Two particular methods for solving the problem $\mathcal{P}$ using OCO are described below. These methods are referred to herein as "Method 1" and "Method 2." These methods can be viewed as specific examples of the process of FIG. 2.

Method 1: On-Line Power Control for D2D Networks with Full NSI Feedback (OPCD-FNF)

A. Convexification of Optimization Problem

In the framework of OCO, the convexity of the problem is required. As will be understood by those of skill in the art, a convex optimization problem is an optimization problem in which the objective function is a convex function and the feasible set is a convex set. With the presence of interference from other D2D pairs, the objective is not concave in the optimization variables.

Hence, the following method is proposed to convexify the problem.

$$R_{i,t} = \log\left(1 + \Gamma \frac{p_i(t)h_{ii}(t)}{I_i(t) + \sum_{j=1,j\neq i}^{N} p_j(t)h_{ij}(t)}\right) =$$

$$\log\left(\sum_{j=1,j\neq i}^{N} p_j(t)h_{ij}(t) + I_i(t) + \Gamma p_i(t)h_{ii}(t)\right) -$$

$$\log(I_i(t)) - \log\left(1 + \frac{\sum_{j=1,j\neq i}^{N} p_j(t)h_{ij}(t)}{I_i(t)}\right) \overset{(a)}{\geq} \log$$

$$\left(\sum_{j=1,j\neq i}^{N} p_j(t)h_{ij}(t) + I_i(t) + \Gamma p_i(t)h_{ii}(t)\right) - \log(I_i(t)) - \frac{\sum_{j=1,j\neq i}^{N} p_j(t)h_{ij}(t)}{I_i(t)},$$

where ($\alpha$) is based on the inequality $\log(1+x) \leq x$ when $x \geq 0$.

Let $$\tilde{R}_{i,t} =$$

$$\log\left(\sum_{j=1,j\neq i}^{N} p_j(t)h_{ij}(t) + I_i(t) + \Gamma p_i(t)h_{ii}(t)\right) - \log(I_i(t)) - \frac{\sum_{j=1,j\neq 1}^{N} h_{ij}(t)p_j(t)}{I_i(t)}$$

Thus, the original problem P is convexified as the following problem:

$$\tilde{\mathcal{P}}: \max_{\{p(t)\}} \lim_{T\to\infty} \frac{1}{T} \sum_{t=1}^{T} \sum_{i=1}^{N} f_{i,t}(p(t))$$

s.t. $p_{i,min} \leq p_i(t) \leq p_{i,max}, \forall i \in \mathcal{N}, 1 \leq t \leq T,$ $$\sum_{i=1}^{N} G_i p_i(t) \leq I_{max}^C, \forall 1 \leq t \leq T,$$

where $f_{i,t}(p(t)) = w_i \tilde{R}_{i,t}.$

Based on the concavity of $\tilde{R}_{i,t}$ and the fact that the constraints are linear constraints, we know that problem $\tilde{\mathcal{P}}$ is convex.

B. Per-Time Slot Problem

We resort to the On-Line Gradient Method (OGD) to solve the optimization problem $\tilde{\mathcal{P}}$.

Then in time slot t, the per-time slot optimization problem is:

$$\tilde{\mathcal{P}}_t: \max_{\{p(t)\}} \sum_{i=1}^{N} \tilde{\theta}_i(t) p_i(t) - \alpha(p_i(t) - p_i(t-1)^*)^2 \quad (1.1)$$

s.t. $p_{i,min} \leq p_i(t) \leq p_{i,max}, \forall i \in \mathcal{N},$ $$\sum_{i=1}^{N} G_i p_i(t) \leq I_{max}^C, \text{ where}$$

$$\tilde{\theta}_i(t) = \sum_{j=1}^{N} \frac{\partial f_{j,t}(p(t-D))}{\partial p_i(t-D)} \bigg|_{p(t-D)=p(t-D)^*}$$

and $p(t)^* = [p(t)^*]$ denotes the optimal solution to problem $\tilde{\mathcal{P}}_t$ for all t, and $\alpha$ is a scaling variable chosen to weight the difference between $p_i(t)$ and $p_i(t-1)^*$ as part of the optimization problem and typically is a value between 0 and 1.

Let $$\beta_i = \frac{\tilde{\theta}_i(t)}{\alpha} + 2p_i(t-1)^*, \overline{\lambda}_i = \frac{\beta_i - 2p_{i,min}}{G_i}, \text{ and } \underline{\lambda}_i = \frac{\beta_i - 2p_{i,max}}{G_i}.$$

C. OPCD-FNF

In the proposed OPCD-FNF scheme, each D2D pair sends its local NSI, i.e.

$$\mathfrak{N}_i((t)) = \left\{\{h_{ij}(t)\}_{j=1}^{j=N}, I_i(t)\right\},$$

to the coordinator in time slot t. Then the coordinator solves problem $\tilde{\mathcal{P}}_t$ formulated by delayed NSI from D2D pairs based on a one dimensional search for an auxiliary variable denoted by $\lambda$ as shown below.

The pseudo-code of the proposed OPCD-FNF are as follows:

---

Algorithm 1: OPCD-FNF

---

Input: $\{w_i\}, \{G_i\}, \alpha, N, D, T.$
1 Coordinator randomly choose $\{p_i(-d)^*\}$ from the feasible set for $1 \leq d \leq D.$
2 {For t = 0 to T}
3 D2D pair i collects its NSI, i.e., $\{h_{ij}(t)\}_{j=1}^{N}$ and $I_i(t)$, and send these information to the coordinator, for all i;
4 Coordinator runs the following codes based on the delayed NSI received from D2D pairs;

Compute $\{\tilde{\theta}_i(t)\}$ by Eq. (1.1),

Compute $\{\beta_i\}, \{\underline{\lambda}_i\}$, and $\{\overline{\lambda}_i\}$, where $\beta_i = \frac{\tilde{\theta}_i(t)}{\alpha} + 2p_i(t-1)^*, \overline{\lambda}_i = \frac{\beta_i - 2p_{i,min}}{G_i},$ Algorithm 1: OPCD-FNF and $\underline{\lambda}_i = \frac{\beta_i - 2p_{i,max}}{G_i}$.

IF $\{2p_{i,min} \geq \beta_i \text{ for all } i\}$
    $p_i(t)^* = p_{i,min}$ for all i;
ELSE
    Sort $\{0, \{\underline{\lambda}_i\}, \{\overline{\lambda}_i\}\}$ in a ascending order, and remove the negative numbers and duplicates. And denote by $\{\lambda_i'\}$ the new sorted set, where $\lambda_i' > \lambda_j'$ if $i > j$. And the cardinality is N'.
    FOR $\{k = 2 \text{ to } N'\}$
        Compute set $\overline{\mathcal{N}} = \{i \in \mathcal{N} : \overline{\lambda}_i \leq \lambda_{k-1}'\}$, and set $p_i(t)^* = p_{i,min}$ for $i \in \overline{\mathcal{N}}$.
        Compute set $\underline{\mathcal{N}} = \{i \in \mathcal{N} : \underline{\lambda}_i \geq \lambda_k'\}$, and set $p_i(t)^* = p_{i,max}$ for $i \in \underline{\mathcal{N}}$.

Compute $I_{max}^{c'} = I_{max}^C - \sum_{i \in \overline{\mathcal{N}} \cup \underline{\mathcal{N}}} G_i p_i(t)^*$.

Compute $\lambda = \frac{\sum_{i \in \mathcal{N}'} \beta_i - 2I_{max}^{c'}}{\sum_{i \in \mathcal{N}'} G_i}$, where $\mathcal{N}' = \mathcal{N} \setminus (\overline{\mathcal{N}} \cup \underline{\mathcal{N}})$.

IF $\{\lambda_{k-1}' \leq \lambda \leq \lambda_k'\}$
            Set $p_i(t)^* = \frac{\beta_i - \lambda G_i}{2}$ for $i \in \mathcal{N}'$ Break;
        ENDIF
    ENDFOR
ENDIF
5: Coordinator sends the power control decisions $\{p_i(t)^*\}$ to the D2D pairs;
ENDFOR

---

The pseudo-code above implements the OGD (On-line Gradient Method) for the OPCD-FNF problem. It orders the auxiliary optimization parameter lambda from minimum and to maximum values and searches over the range of lambda values to find the value at which Equation 1.1 is maximized.

II. Method 2: On-Line Power Control for D2D Networks with Partial NSI Feedback (OPCD-PNF)

In the OPCD-FNF, the full NSI in each time slot is sent to the coordinator. It requires a lot of channel measurement and feedback. In this section, the focus is on the scenario where the local NSI of only K D2D pairs (K≤N), i.e. partial NSI, is sent back to the coordinator.

For notational convenience, let $\mathcal{J}_t = \{i_t^1, \ldots, t_t^K\}$ be the collection of K selected D2D pairs that send the local NSI to the coordinator in time slot t. Furthermore, we let $\mathbb{J} = \{\mathcal{J} \subseteq \mathcal{N} \mid \text{card}(\mathcal{J}) = K\}$ and $\mathbb{J}_i = \{\mathcal{J} \in \mathbb{J} \mid i \in \mathcal{J}\}$, where card($\mathcal{J}$) is the cardinality of $\mathcal{J}$.

We consider the scheme where K D2D pairs are randomly chosen to send its local NSI to the coordinator in each time slot. Let $P_\mathcal{J}$ be the probability of the event that the D2D pairs in set $\mathcal{J}$ are chosen to send the local NSI, where $\mathcal{J} \in \mathbb{J}$. We have $\sum_{\mathcal{J} \in \mathbb{J}} P_\mathcal{J} = 1$. Furthermore, let $P_i = \sum_{\mathcal{J} \in \mathbb{J}_i} P_\mathcal{J}$

A. Per-Time Slot Problem

In time slot t, the coordinator receives delayed local NSI sent from D2D pairs in set $\mathcal{J}_{t-D}$. Then the coordinator solves the following per-time slot problem:

$$\overline{\mathcal{P}}_t : \max_{p(t)} \sum_{i=1}^{N} \overline{\theta}_i(t) p_i(t) - \alpha(p_i(t) - p(t-1)^*)^2 \quad (1.2)$$

s.t. $p_{i,min} \leq p_i(t) \leq p_{i,max}, \forall i \in \mathcal{N}$, $\sum_{i=1}^{N} G_i p_i(t) \leq I_{max}^C$, where $\overline{\theta}_i(t) = \sum_{j \in \ldots} \frac{1}{P_j} \frac{\partial f_{j,t-D}(p(t-D))}{\partial p_i(t-D)} \Big|_{p(t-D) = p(t-D)^*}$ and $p(t)^* = [p(t)^*]$ denotes the optimal solution to problem $\overline{\mathcal{P}}_t$ for all t.

B. OPCD-PNF

In the proposed OPCD-PNF scheme, K D2D pairs are randomly selected to send the local NSI to the coordinator in time slot t, and the collection of these D2D pairs is denoted by $\mathcal{J}_t$. These D2D pairs send local NSI, i.e., $$\mathfrak{N}_i(t) = \left\{ \{h_{i,j}(t)\}_{j=1}^{j=N}, I_i(t) \right\}$$

to the coordinator in time slot t. Then the coordinator solves problem $\overline{\mathcal{P}}_t$ formulated by delayed NSI from D2D pairs based on a one dimensional search for an auxiliary variable denoted by λ as shown below.

The pseudo-code of the proposed OPCD-PNF are as follows:

---
Algorithm 2: OPCD-PNF
---

Input: $\{w_i\}$, $\{G_i\}$, $\alpha$, N, D, T, K, $\{P_x\}$.
1 Coordinator randomly choose $\{p_i(-d)^*\}$ from the feasible set for $1 \le d \le D$.
2 {For t = 0 to T}
3. K D2D pairs are randomly selected to send the local NSI to the coordinator based on probability distribution $\{P_x\}$, and the collection of the selected D2D pairs in time slot t is denoted by $\mathcal{I}_t$.
4 D2D pair i collects its NSI, i.e., $\{h_{ij}(t)\}_{j=1}^N$ and $I_i(t)$, and send these information to the coordinator, for all i;
5 The coordinator performs the following calculations based on the delayed NSI received from D2D pairs;

Compute $\{\bar{\theta}_i(t)\}$ by Eq. (1.2),

Compute $\{\beta_i\}$, $\{\underline{\lambda}_i\}$, and $\{\overline{\lambda}_i\}$, where $\beta_i = \dfrac{\bar{\theta}_i(t)}{\alpha} + 2p_i(t-1)^*$, $\overline{\lambda}_i = \dfrac{\beta_i - 2p_{i,min}}{G_i}$, and $\underline{\lambda}_i = \dfrac{\beta_i - 2p_{i,max}}{G_i}$.

IF $\{2p_{i,min} \ge \beta_i$ for all i$\}$
  $p_i(t)^* = p_{i,min}$ for all i;
ELSE
  Sort $\{0, \{\underline{\lambda}_i\},\{\overline{\lambda}_i\}\}$ in a ascending order and remove the negative numbers and duplicates. And denote by $\{\lambda_i'\}$ the new sorted set, where $\lambda_i' > \lambda_j'$ if i > j. And the cardinality is N'.
  FOR {k = 2 to N'}
    Compute set $\overline{\mathcal{N}} = \{i \in \mathcal{N}: \overline{\lambda}_i \le \lambda_{k-1}'\}$, and set $p_i(t)^* = p_{i,min}$ for $i \in \overline{\mathcal{N}}$.
    Compute set $\underline{\mathcal{N}} = \{i \in \mathcal{N}: \underline{\lambda}_i \ge \lambda_k'\}$, and set $p_i(t)^* = p_{i,max}$ for $i \in \underline{\mathcal{N}}$.

Compute $I_{max}^{c'} = I_{max}^c - \sum_{i \in \overline{\mathcal{N}} \cup \underline{\mathcal{N}}} G_i p_i(t)^*$.

Compute $\lambda = \dfrac{\sum_{i \in \mathcal{N}'} \beta_i - 2I_{max}^{c'}}{\sum_{i \in \mathcal{N}'} G_i}$, where $\mathcal{N}' = \mathcal{N} \setminus (\overline{\mathcal{N}} \cup \underline{\mathcal{N}})$.

IF $\{\lambda_{k-1}' \le \lambda \le \lambda_k'\}$
      Set $p_i(t)^* = \dfrac{\beta_i - \lambda G_i}{2}$ for $i \in \mathcal{N}'$.

Break;
    ENDIF
  ENDFOR
ENDIF
6 Coordinator sends the power control decisions $\{p_i(t)^*\}$ to the D2D pairs;
ENDFOR

---

The pseudo-code above implements the OGD (On-line Gradient Method) for the OPCD-PNF problem. It orders the auxiliary optimization parameter lambda from minimum and to maximum values and searches over the range of lambda values to find the value for which Equation 1.1 is maximized.

C. Choices of $\{P_\mathcal{J}\}$

One possible choice of $\{P_\mathcal{J}\}$ is that $$P_\mathcal{J} = \dfrac{1}{|\mathcal{J}|}$$

for all $\mathcal{J} \in \mathscr{J}$.

Another possible choice of $\{P_\mathcal{J}\}$ is the solution to the following optimization problem $$\min \bar{B}$$
$$\{P_\mathcal{J}\}$$
s.t. $\sum P_\mathcal{J} \le 1$;

$P_\mathcal{J} \ge 0, \forall \mathcal{J} \in \mathscr{J}$, where $\bar{B} = \sum_{\mathcal{J} \in \mathscr{J}} P_\mathcal{J} \left( \sum_{i \in \mathcal{J}} \dfrac{B_i}{P_i} \right)^2$, and $B_i = \max_{t,\{h_{ij}(t),I_i(t),p_t\}} |\nabla f_{i,t}(p(t))|$ for all $i$.

Figure 3:
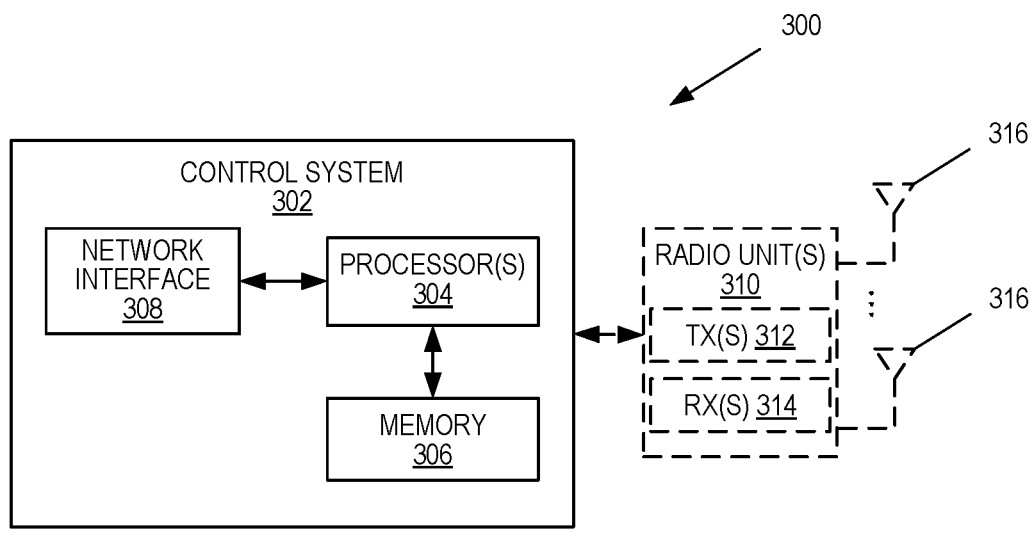
FIGS. 3 through 5 illustrate example embodiments of a network node.

FIG. 3 is a schematic block diagram of a network node 300 according to some embodiments of the present disclosure. The network node 300 may be, for example, the BS 102 of FIG. 1. As illustrated, the network node 300 includes a control system 302 that includes one or more processors 304 (e.g., Central Processing Units (CPUs), Application Specific Integrated Circuits (ASICs), Field Programmable Gate Arrays (FPGAs), and/or the like), memory 306, and a network interface 308. The one or more processors 304 are also referred to herein as processing circuitry. In addition, if the network node is a radio access node (e.g., a base station), the network node 300 may also include one or more radio units 310 that each includes one or more transmitters 312 and one or more receivers 314 coupled to one or more antennas 316. The radio units 310 may be referred to or be part of radio interface circuitry. In some embodiments, the radio unit(s) 310 is external to the control system 302 and connected to the control system 302 via, e.g., a wired connection (e.g., an optical cable). However, in some other embodiments, the radio unit(s) 310 and potentially the antenna(s) 316 are integrated together with the control system 302. The one or more processors 304 operate to provide one or more functions of a power control coordinator for D2D pairs as described herein. In some embodiments, the function(s) are implemented in software that is stored, e.g., in the memory 306 and executed by the one or more processors 304.

Figure 4:
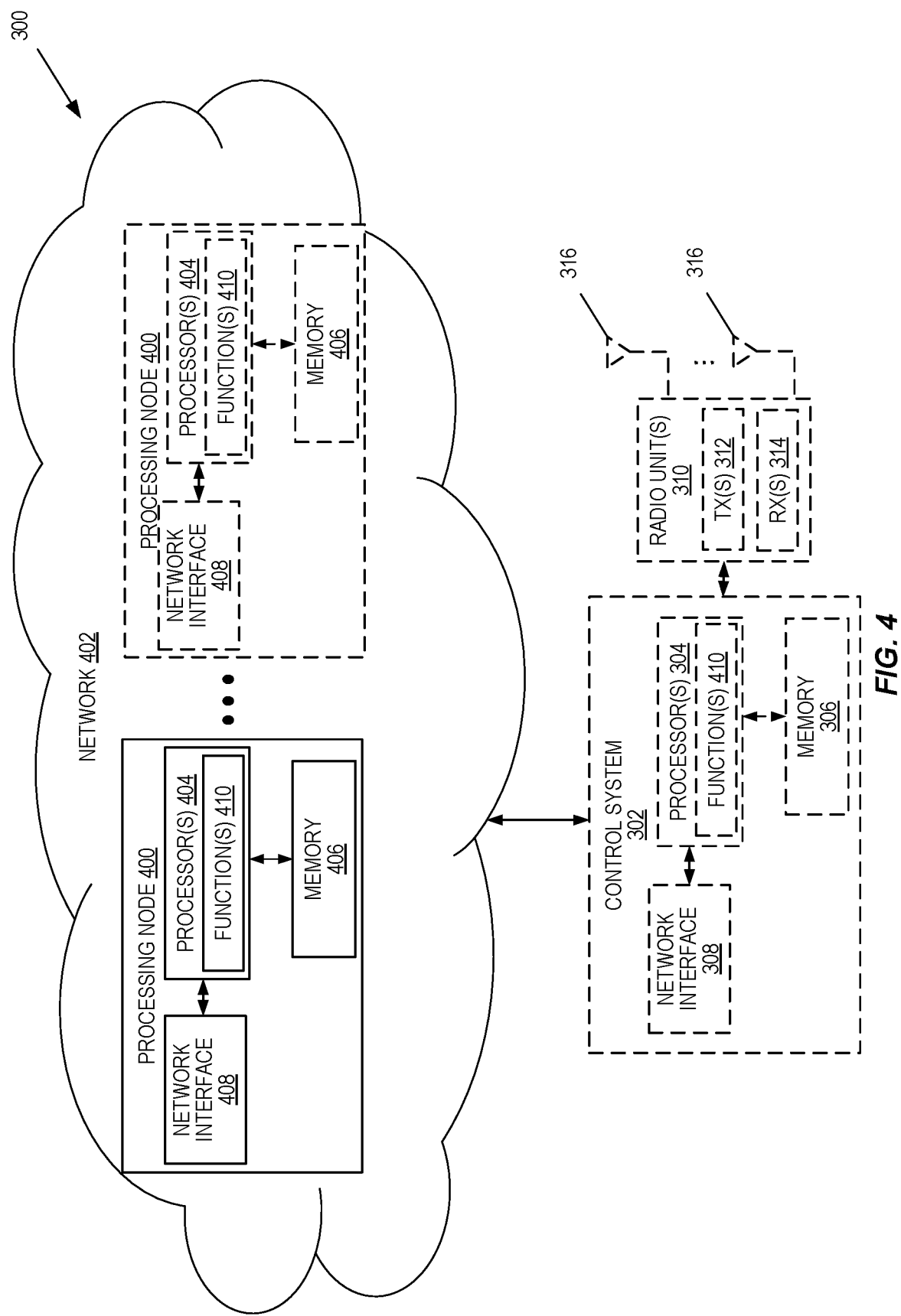

FIG. 4 is a schematic block diagram that illustrates a virtualized embodiment of the network node 300 according to some embodiments of the present disclosure. As used herein, a "virtualized" network node is an implementation of the network node 300 in which at least a portion of the functionality of the network node 300 is implemented as a virtual component(s) (e.g., via a virtual machine(s) executing on a physical processing node(s) in a network(s)). As illustrated, in this example, the network node 300 includes one or more processing nodes 400 coupled to or included as part of a network(s) 402 via the network interface 308. Each processing node 400 includes one or more processors 404 (e.g., CPUs, ASICs, FPGAs, and/or the like), memory 406, and a network interface 408. Optionally, the network node 300 may also include the control system 302 that includes the one or more processors 304 (e.g., CPUs, ASICs, FPGAs, and/or the like), the memory 306, and the network interface 308 and/or the one or more radio units 310 that each includes the one or more transmitters 312 and the one or more receivers 314 coupled to the one or more antennas 316, as described above.

In this example, functions 410 of the network node 300, and in particular the functions of the power control coordinator for the D2D pairs, described herein are implemented at the one or more processing nodes 400 or distributed across the control system 302 and the one or more processing nodes 400 in any desired manner. In some particular embodiments, some or all of the functions 410 of the network node 300 described herein are implemented as virtual components executed by one or more virtual machines implemented in a virtual environment(s) hosted by the processing node(s) 400. Notably, in some embodiments, the control system 302 may not be included, in which case the radio unit(s) 310 communicate directly with the processing node(s) 400 via an appropriate network interface(s).

In some embodiments, a computer program including instructions which, when executed by at least one processor, causes the at least one processor to carry out the functionality of network node 300 or a node (e.g., a processing node 400) implementing one or more of the functions 410 of the network node 300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 5:
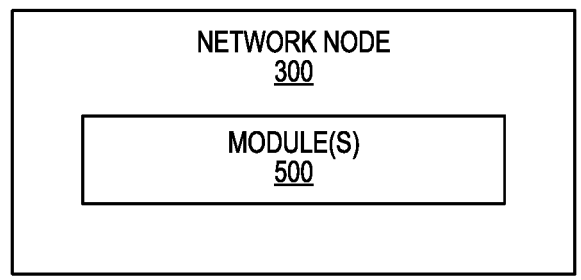

FIG. 5 is a schematic block diagram of the network node 300 according to some other embodiments of the present disclosure. The radio access node 300 includes one or more modules 500, each of which is implemented in software. The module(s) 500 provide the functionality of the network node 300, and in particular the power control coordinator for the D2D pairs, described herein. This discussion is equally applicable to the processing node 400 of FIG. 4 where the modules 500 may be implemented at one of the processing nodes 400 or distributed across multiple processing nodes 400 and/or distributed across the processing node(s) 400 and the control system 302.

Figure 6:
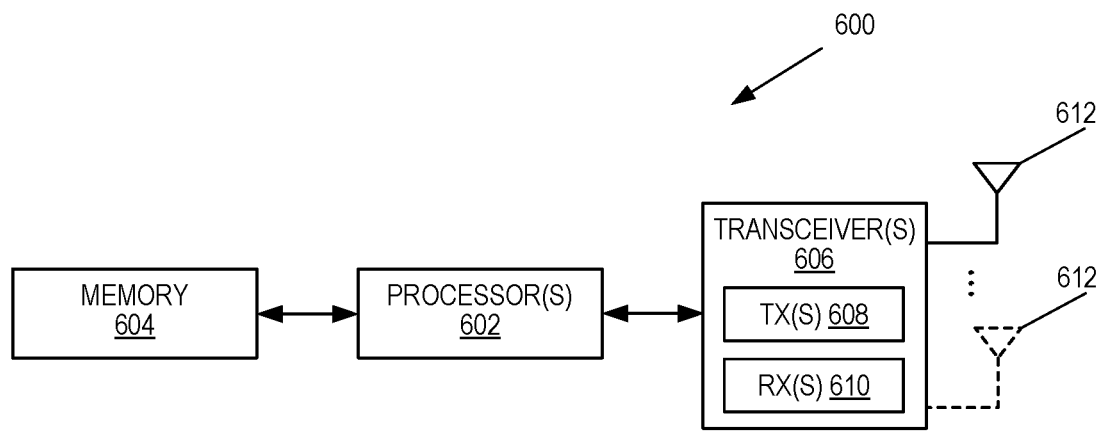
FIGS. 6 and 7 illustrate example embodiments of a User Equipment (UE).

FIG. 6 is a schematic block diagram of a UE 600 according to some embodiments of the present disclosure. As illustrated, the UE 600 includes one or more processors 602 (e.g., CPUs, ASICs, FPGAs, and/or the like), memory 604, and one or more transceivers 606 each including one or more transmitters 608 and one or more receivers 610 coupled to one or more antennas 612. The transceiver(s) 606 includes radio-front end circuitry connected to the antenna(s) 612 that is configured to condition signals communicated between the antenna(s) 612 and the processor(s) 602, as will be appreciated by on of ordinary skill in the art. The processors 602 are also referred to herein as processing circuitry. The transceivers 606 are also referred to herein as radio circuitry. In some embodiments, the functionality of the UE 600 described above, and in particular the functionality of the power control coordinator for the D2D pairs, may be fully or partially implemented in software that is, e.g., stored in the memory 604 and executed by the processor(s) 602. Note that the UE 600 may include additional components not illustrated in FIG. 6 such as, e.g., one or more user interface components (e.g., an input/output interface including a display, buttons, a touch screen, a microphone, a speaker(s), and/or the like and/or any other components for allowing input of information into the UE 600 and/or allowing output of information from the UE 600), a power supply (e.g., a battery and associated power circuitry), etc.

In some embodiments, a computer program including instructions which, when executed by at least one processor, causes the at least one processor to carry out the functionality of the UE 600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
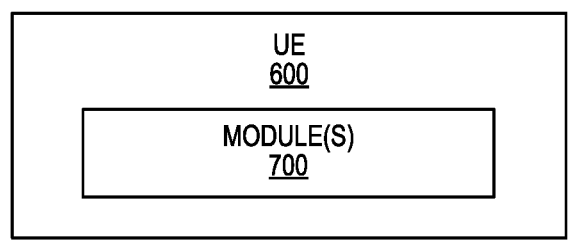

FIG. 7 is a schematic block diagram of the UE 600 according to some other embodiments of the present disclosure. The UE 600 includes one or more modules 700, each of which is implemented in software. The module(s) 700 provide the functionality of the UE 600 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method of operation of a power control coordinator to control transmission power of a plurality of Device-to-Device (D2D) pairs that co-exist with a Cellular User Equipment (CUE) that communicates with a base station of a cellular communications network, comprising: obtaining (200), for a particular time slot, delayed Network State Information (NSI) feedback from at least some of a plurality of D2D pairs; computing (202) transmission powers for the D2D pairs, respectively, for the particular time slot using On-Line Convex Optimization (OCO) to solve an optimization problem that maximizes a weighted sum data rate of D2D pairs with a constraint of maximum expected interference to the base station; and providing (204), to each D2D pair, an indication of the computed transmission power for the D2D pair for the particular time slot.

Embodiment 2: The method of embodiment 1 wherein obtaining the delayed NSI feedback from the at least some of the plurality of D2D pairs comprises obtaining the delayed NSI feedback from all of the plurality of D2D pairs.

Embodiment 3: The method of embodiment 2 wherein the optimization problem is:

$$\tilde{\mathcal{P}}_t: \max_{\{p(t)\}} \sum_{i=1}^{N} \tilde{\theta}_i(t) p_i(t) - \alpha(p_i(t) - p_i(t-1)^*)^2$$

s.t. $p_{i,min} \leq p_i(t) \leq p_{i,max}, \forall i \in \mathcal{N}$, $\sum_{i=1}^{N} G_i p_i(t) \leq I_{max}^C$, where $\tilde{\theta}_i(t) = \sum_{j=1}^{N} \frac{\partial f_{j,t}(p(t-D))}{\partial p_i(t-D)} |_{p(t-D)=p(t-D)^*}$ and:

$\tilde{\mathcal{P}}_t$ denotes the optimization problem, and
p(t)*=[p(t)*] denotes an optimal solution to the optimization problem $\tilde{\mathcal{P}}_t$ for all t.

Embodiment 4: The method of embodiment 1 wherein obtaining the delayed NSI feedback from the at least some of the plurality of D2D pairs comprises obtaining the delayed NSI feedback from a limited subset of the plurality of D2D pairs.

Embodiment 5: The method of embodiment 4 wherein the optimization problem is:

$$\overline{\mathcal{P}}_t: \max_{\{p(t)\}} \sum_{i=1}^{N} \overline{\theta}_i(t) p_i(t) - \alpha(p_i(t) - p(t-1)^*)^2$$

s.t. $p_{i,min} \leq p_i(t) \leq p_{i,max}, \forall i \in \mathcal{N}$, where $\sum_{i=1}^{N} G_i p_i(t) \leq I_{max}^C$ $\overline{\theta}_i(t) = \sum_{\cdot} \frac{1}{P_j} \frac{\partial f_{j,t-D}(p(t-D))}{\partial p_i(t-D)} |_{p(t-D)=p(t-D)^*}$ and:

$\overline{\mathcal{P}}_t$ denotes the optimization problem, and
p(t)*=[p(t)*] denotes an optimal solution to the optimization problem $\overline{\mathcal{P}}_t$ for all t.

Embodiment 6: The method of any one of embodiments 1 to 5 wherein the method is implemented in a network node of the cellular communications network.

Embodiment 7: A network node for a cellular communications network, the network node adapted to perform the method of any one of embodiments 1 to 5.

Embodiment 8: The network node of embodiment 7 wherein the network node is the base station.

Embodiment 9: A network node for a cellular communications network, comprising: processing circuitry operable to cause the network node to perform the method of any one of embodiments 1 to 5.

Embodiment 10: A network node for a cellular communications network, the network node comprising: an obtaining module operable to obtain, for a particular time slot, delayed Network State Information (NSI) feedback from at least some of a plurality of Device-to-Device (D2D) pairs; a computing module operable to compute transmission powers for the D2D pairs, respectively, for the particular time slot using On-Line Convex Optimization (OCO) to solve an optimization problem that maximizes a weighted sum data rate of D2D pairs with a constraint of maximum expected interference to the base station; and a providing module operable to provide, to each D2D pair, an indication of the computed transmission power for the D2D pair for the particular time slot.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BCO Bandit Convex Optimization
BS Base Station
BTS Base Transceiver Station
CPU Central Processing Unit
CSI Channel State Information
CUE Cellular User Equipment
D2D Device-to-Device
DAS Distributed Antenna System
DRx Device-to-Device Receiver
DSP Digital Signal Processor
DTx Device-to-Device Transmitter
EDGE Enhanced Data Rates for Global System for Mobile Communications
eNB Enhanced or Evolved Node B
E-UTRAN Evolved Universal Terrestrial Radio Access Network
FDD Frequency Division Duplexing
FPGA Field Programmable Gate Array GERAN Global System for Mobile (GSM) Communications Enhanced Data Rates for GSM Evolution Radio Access Network
GSM Global System for Mobile Communications
LEE Laptop Embedded Equipment
LME Laptop Mounted Equipment
LTE Long Term Evolution
LTE-A Long Term Evolution Advanced
M2M Machine-to-Machine
MAB Multi-Armed Bandit
MIMO Multiple Input Multiple Output
MME Mobility Management Entity
MTC Machine Type Communication
NR New Radio
NSI Network State Information
OCO On-Line Convex Optimization
OFDM Orthogonal Frequency Division Multiplexing
OGD On-Line Gradient Method
OPCD-FNF On-Line Power Control for Device-to-Device Networks with Full Network State Information Feedback
OPCD-PNF On-Line Power Control for Device-to-Device Networks with Partial Network State Information Feedback
PDA Personal Digital Assistant
QoS Quality of Service
RAM Random Access Memory
ROM Read Only Memory
RRH Remote Radio Head
RRU Remote Radio Unit
TDD Time Division Duplexing
UE User Equipment
USB Universal Serial Bus
UTRA Universal Terrestrial Radio Access
WCDMA Wideband Code Division Multiple Access Those skilled in the art will recognize improvements and modifications to the embodiments of the present disclosure. All such improvements and modifications are considered within the scope of the concepts disclosed herein.

REFERENCES

[1] J. Liu, N. Kato, J. Ma, and N. Kadowaki, "Device-to-device communication in lte-advanced networks: A survey," IEEE Communications Surveys Tutorials, vol. 17, no. 4, pp. 1923-1940, Fourthquarter 2015.

[2] E. Bastug, M. Bennis, and M. Debbah, "Living on the edge: The role of proactive caching in 5G wireless networks," IEEE Communications Magazine, vol. 52, no. 8, pp. 82-89, August 2014.

[3] K. Shanmugam, N. Golrezaei, A. G. Dimakis, A. F. Molisch, and G. Caire, "Femtocaching: Wireless content delivery through distributed caching helpers," IEEE Transactions on Information Theory, vol. 59, no. 12, pp. 8402-8413, December 2013.

[4] N. Golrezaei, A. G. Dimakis, and A. F. Molisch, "Wireless device-to-device communications with distributed caching," in Proc. IEEE International Symposium on Information Theory, July 2012.

[5] M. Ji, G. Caire, and A. F. Molisch, "The throughput-outage tradeoff of wireless one-hop caching networks," IEEE Transactions on Information Theory, vol. 61, no. 12, pp. 6833-6859, December 2015.

[6] M. Ji, G. Caire, and A. F. Molisch, "Wireless device-to-device caching networks: Basic principles and system performance," IEEE Journal on Selected Areas in Communications, vol. 34, no. 1, pp. 176-189, January 2016.

[7] K. Poularakis, G. Iosifidis, A. Argyriou, I. Koutsopoulos, and L. Tassiulas, "Caching and operator cooperation policies for layered video content delivery," in Proc. IEEE International Conference on Computer Communications, April 2016.

[8] K. Poularakis, G. Iosifidis, A. Argyriou, and L. Tassiulas, "Video delivery over heterogeneous cellular networks: Optimizing cost and performance," in IEEE Conference on Computer Communications, April 2014.

[9] B. Dai and W. Yu, "Joint user association and content placement for cache-enabled wireless access networks," in Proc. IEEE International Conference on Acoustics, Speech and Signal Processing, March 2016.

[10] C. Y. B. Chen and A. F. Molisch, "Cache-enabled device-to-device communications: Offloading gain and energy cost," IEEE Transactions on Wireless Communications, vol. 16, no. 7, pp. 4519-4536, July 2017.

[11] Y. Guo, L. Duan, and R. Zhang, "Cooperative local caching under heterogeneous file preferences," IEEE Transactions on Communications, vol. 65, no. 1, pp. 444-457, January 2017.

[12] S. Krishnan and H. S. Dhillon, "Distributed caching in device-to-device networks: A stochastic geometry perspective," in Proc. Asilomar Conference on Signals, Systems and Computers, November 2015.

[13] D. Malak, M. Al-Shalash, and J. G. Andrews, "Optimizing content caching to maximize the density of successful receptions in device-to-device networking," IEEE Transactions on Communications, vol. 64, no. 10, pp. 4365-4380, October 2016.

[14] S. H. Chae, J. Y. Ryu, T. Q. S. Quek, and W. Choi, "Cooperative transmission via caching helpers," in Proc. IEEE Global Communications Conference, December 2015.

[15] Z. Chen and M. Kountouris, "D2D caching vs. small cell caching: Where to cache content in a wireless network?" in Proc. IEEE International Workshop on Signal Processing Advances in Wireless Communications, July 2016, pp. 1-6.

[16] A. Afzal, S. A. R. Zaidi, D. McLernon, and M. Ghogho, "On the analysis of cellular networks with caching and coordinated device-to-device communication," in Proc. IEEE International Conference on Communications, May 2016.

[17] J. Rao, H. Feng, C. Yang, Z. Chen, and B. Xia, "Optimal caching placement for D2D assisted wireless caching networks," in Proc. IEEE International Conference on Communications, May 2016.

[18] Z. Chen, N. Pappas, and M. Kountouris, "Probabilistic caching in wireless d2d networks: Cache hit optimal versus throughput optimal," IEEE Communications Letters, vol. 21, no. 3, pp. 584-587, March 2017.

[19] Y. Wang, X. Tao, X. Zhang, and Y. Gu, "Cooperative caching placement in cache-enabled d2d underlaid cellular network," IEEE Communications Letters, vol. 21, no. 5, pp. 1151-1154, May 2017.

[20] S. H. Chae and W. Choi, "Caching placement in stochastic wireless caching helper networks: Channel selection diversity via caching," IEEE Transactions on Wireless Communications, vol. 15, no. 10, pp. 6626-6637, October 2016.

[21] D. Malak, M. Al-Shalash, and J. G. Andrews, "Spatially correlated content caching for device-to-device communications," IEEE Transactions on Wireless Communications, vol. 17, no. 1, pp. 56-70, January 2018.

[22] B. Blaszczyszyn and A. Giovanidis, "Optimal geographic caching in cellular networks," in Proc. IEEE International Conference on Communications, June 2015.

[23] X. Lin, J. G. Andrews, and A. Ghosh, "Spectrum sharing for device-to-device communication in cellular networks," IEEE Transactions on Wireless Communications, vol. 13, no. 12, pp. 6727-6740, December 2014.

[24] K. Zhu and E. Hossain, "Joint mode selection and spectrum partitioning for device-to-device communication: A dynamic stackelberg game," IEEE Transactions on Wireless Communications, vol. 14, no. 3, pp. 1406-1420, March 2015.

[25] W. Bao and B. Liang, "Rate maximization through structured spectrum allocation and user association in heterogeneous cellular networks," IEEE Transactions on Communications, vol. 63, no. 11, pp. 4510-4524, November 2015.

[26] Y. Lin, W. Bao, W. Yu, and B. Liang, "Optimizing user association and spectrum allocation in hetnets: A utility perspective," IEEE Journal on Selected Areas in Communications, vol. 33, no. 6, pp. 1025-1039, June 2015.

[27] H. S. Jo, Y. J. Sang, P. Xia, and J. G. Andrews, "Heterogeneous cellular networks with flexible cell association: A comprehensive downlink sinr analysis," IEEE Transactions on Wireless Communications, vol. 11, no. 10, pp. 3484-3495, October 2012.

What is claimed is:

1. A method of operation of a power control coordinator to control transmission power of a plurality of Device-to-Device (D2D) pairs that co-exist with a Cellular User Equipment (CUE) that communicates with a base station of a cellular communications network, comprising:
   obtaining, for a particular time slot, delayed Network State Information (NSI) feedback from at least some of the plurality of D2D pairs;
   computing transmission powers for the D2D pairs, respectively, for the particular time slot using On-Line Convex Optimization (OCO) to solve an optimization problem that maximizes a weighted sum data rate of D2D pairs with a constraint of maximum expected interference to the base station; and
   providing, to each D2D pair, an indication of the computed transmission power for the D2D pair for the particular time slot.

2. The method of claim 1 wherein obtaining the delayed NSI feedback from the at least some of the plurality of D2D pairs comprises obtaining the delayed NSI feedback from all of the plurality of D2D pairs.

3. The method of claim 2 wherein the optimization problem is:

$$\tilde{P}_t : \max_{\{p(t)\}} \sum_{i=1}^{N} \tilde{\theta}_i(t) p_i(t) - \alpha(p_i(t) - p_i(t-1)^*)^2$$

$$\text{s.t.} \quad p_{i,min} \leq p_i(t) \leq p_{i,max}, \forall i \in \mathcal{N},$$

$$\sum_{i=1}^{N} G_i p_i(t) \leq I_{max}^C, \text{ where}$$

$$\tilde{\theta}_i(t) = \sum_{j=1}^{N} \frac{\partial f_{j,t}(p(t-D))}{\partial p_i(t-D)} \bigg|_{p(t-D)=p(t-D)^*}$$

and:

$\tilde{P}$ denotes the optimization problem,
$p_i(t)$ is a transmission power of a D2D transmitter of the i-th D2D pair for time slot t,
$\alpha$ is a defined scaling factor,
$p_{i,min}$ is a minimum transmission power of the D2D transmitter of the i-th D2D pair,
$p_{i,max}$ is a maximum transmission power of the D2D transmitter of the i-th D2D pair,
$\mathcal{N}$ is the set of i values for the plurality of D2D pairs,
$G_i = \mathbb{E}[g_i(t)]$ where $g_i(t)$ is a channel gain from the D2D transmitter of the i-th D2D pair to the base station for time slot t,
$I_{max}^c$ is a restraint on a maximum expected interference power from the plurality of D2D pairs to the base station,
t−D is a starting time slot index,
$p(t)^* = [p(t)^*]$ denotes an optimal solution to the optimization problem $\tilde{P}_t$ for all t, and
$f_{j,t-D}(p(t-D)) = w_j \tilde{R}_{j,(t-D)}$, where $w_j$ is a weight assigned to the j-th D2D pair and:

$$\tilde{R}_{i,t} = \log\left(\sum_{j=1,j\neq i}^{N} p_j(t)h_{ij}(t) + I_i(t) + \Gamma p_i(t)h_{ii}(t)\right) - \log(I_i(t)) - \frac{\sum_{j=1,j\neq i}^{N} h_{ij}(t)p_j(t)}{I_i(t)}$$

where
$h_{ij}(t)$ is a channel gain from a D2D transmitter of the j-th D2D pair to a D2D receiver of the i-th D2D pair in time slot t,
$I_i(t)$ is a sum power of inter-cell interference, interference from the CUE, and noise received by the i-th D2D pair in time slot t,
$\Gamma$ accounts for a gap between an actual data rate and the Shannon bound, and
$h_{ii}(t)$ is a channel gain from a D2D transmitter of the i-th D2D pair to a D2D receiver of the i-th D2D pair in time slot t.

4. The method of claim 1 wherein obtaining the delayed NSI feedback from the at least some of the plurality of D2D pairs comprises obtaining the delayed NSI feedback from a limited subset of the plurality of D2D pairs.

5. The method of claim 4 wherein the optimization problem is:

$$\bar{P}_t : \max_{p(t)} \sum_{i=1}^{N} \bar{\theta}_i(t) p_i(t) - \alpha(p_i(t) - p(t-1)^*)^2$$

$$\text{s.t.} \quad p_{i,min} \leq p_i(t) \leq p_{i,max}, \forall i \in \mathcal{N},$$

$$\sum_{i=1}^{N} G_i p_i(t) \leq I_{max}^C, \text{ where}$$

$$\bar{\theta}_i(t) = \sum_{j} \frac{1}{P_j} \frac{\partial f_{j,t-D}(p(t-D))}{\partial p_i(t-D)} \bigg|_{p(t-D)=p(t-D)^*}$$

and:

$\bar{P}_t$ denotes the optimization problem,
$p_i(t)$ is a transmission power of a D2D transmitter of the i-th D2D pair for time slot t, α is a defined scaling factor, $p_{i,min}$ is a minimum transmission power of the D2D transmitter of the i-th D2D pair, $p_{i,max}$ is a maximum transmission power of the D2D transmitter of the i-th D2D pair, $\mathcal{N}$ is the set of i values for the plurality of D2D pairs, $G_i = \mathbb{E}[g_i(t)]$ where $g_i(t)$ is a channel gain from the D2D transmitter of the i-th D2D pair to the base station for time slot t, $I_{max}^c$ is a restraint on a maximum expected interference power from the plurality of D2D pairs to the base station, t−D is a starting time slot index, $\mathcal{J}_{t-D}$ is a set of indices of the limited subset of the plurality of D2D pairs;

$P_j = \sum_{j \in \mathcal{J}_i} P_j$ where $\mathcal{J} \in \mathcal{J}_{t-D}$ and $\mathcal{J}_{t-D} = 1$, p(t)*=[p(t)*] denotes an optimal solution to the optimization problem $\bar{\mathcal{P}}_t$ for all t, and $f_{j,t-D}(p(t-D)) = w_j \tilde{R}_{j,(t-D)}$, where $w_j$ is a weight assigned to the j-th D2D pair and:

$$\tilde{R}_{i,t} = \log\left(\sum_{j=1,j\neq i}^{N} p_j(t)h_{ij}(t) + I_i(t) + \Gamma p_i(t)h_{ii}(t)\right) - \log(I_i(t)) - \frac{\sum_{j=1,j\neq 1}^{N} h_{ij}(t)p_j(t)}{I_i(t)}$$

where:

$h_{ij}(t)$ is a channel gain from a D2D transmitter of the j-th D2D pair to a D2D receiver of the i-th D2D pair in time slot t, $I_i(t)$ is a sum power of inter-cell interference, interference from the CUE, and noise received by the i-th D2D pair in time slot t, $\Gamma$ accounts for a gap between an actual data rate and the Shannon bound, and $h_{ii}(t)$ is a channel gain from a D2D transmitter of the i-th D2D pair to a D2D receiver of the i-th D2D pair in time slot t.

6. The method of claim 1 wherein the method is implemented in a network node of the cellular communications network.

7. A network node that implements a power control coordinator for controlling transmission power of a plurality of Device-to-Device (D2D) pairs that co-exist with a Cellular User Equipment (CUE) that communicates with a base station of a cellular communications network, comprising:

processing circuitry operable to cause the network node to:

obtain, for a particular time slot, delayed Network State Information (NSI) feedback from at least some of the plurality of D2D pairs;

compute transmission powers for the D2D pairs, respectively, for the particular time slot using On-Line Convex Optimization (OCO) to solve an optimization problem that maximizes a weighted sum data rate of D2D pairs with a constraint of maximum expected interference to the base station, wherein overall expected interference power from the plurality of the D2D pairs to the base station does not exceed a certain restraint value; and provide, to each D2D pair, an indication of the computed transmission power for the D2D pair for the particular time slot.

8. The network node of claim 7 wherein the processing circuitry is operable to cause the network node to obtain the delayed NSI feedback from all of the plurality of D2D pairs.

9. The network node of claim 8 wherein the optimization problem is:

$$\tilde{\mathcal{P}}_t: \max_{\{p(t)\}} \sum_{i=1}^{N} \hat{\theta}_i(t)p_i(t) - \alpha(p_i(t) - p_i(t-1)^*)^2$$

$$\text{s.t.} \quad p_{i,min} \leq p_i(t) \leq p_{i,max}, \forall i \in \mathcal{N},$$

$$\sum_{i=1}^{N} G_i p_i(t) \leq I_{max}^C, \text{ where}$$

$$\hat{\theta}_i(t) = \sum_{j=1}^{N} \frac{\partial f_{j,t}(p(t-D))}{\partial p_i(t-D)}\bigg|_{p(t-D)=p(t-D)^*}$$

and:

$\tilde{\mathcal{P}}$ denotes the optimization problem, $p_i(t)$ is a transmission power of a D2D transmitter of the i-th D2D pair for time slot t, α is a defined scaling factor, $p_{i,min}$ is a minimum transmission power of the D2D transmitter of the i-th D2D pair, $p_{i,max}$ is a maximum transmission power of the D2D transmitter of the i-th D2D pair, $\mathcal{N}$ is the set of i values for the plurality of D2D pairs, $G_i = \mathbb{E}[g_i(t)]$ where $g_i(t)$ is a channel gain from the D2D transmitter of the i-th D2D pair to the base station for time slot t, $I_{max}^c$ is a restraint on a maximum expected interference power from the plurality of D2D pairs to the base station, t−D is a starting time slot index, p(t)*=[p(t)*] denotes an optimal solution to the optimization problem $\tilde{P}_t$ for all t, and $f_{j,t-D}(p(t-D)) = w_j \tilde{R}_{j,(t-D)}$, where $w_j$ is a weight assigned to the j-th D2D pair and:

$$\tilde{R}_{i,t} = \log\left(\sum_{j=1,j\neq i}^{N} p_j(t)h_{ij}(t) + I_i(t) + \Gamma p_i(t)h_{ii}(t)\right) - \log(I_i(t)) - \frac{\sum_{j=1,j\neq 1}^{N} h_{ij}(t)p_j(t)}{I_i(t)}$$

where:

$h_{ij}(t)$ is a channel gain from a D2D transmitter of the j-th D2D pair to a D2D receiver of the i-th D2D pair in time slot t, $I_i(t)$ is a sum power of inter-cell interference, interference from the CUE, and noise received by the i-th D2D pair in time slot t, $\Gamma$ accounts for a gap between an actual data rate and the Shannon bound, and $h_{ii}(t)$ is a channel gain from a D2D transmitter of the i-th D2D pair to a D2D receiver of the i-th D2D pair in time slot t.

10. The network node of claim 7 wherein the processing circuitry is operable to cause the network node to obtain the delayed NSI feedback from a limited subset of the plurality of D2D pairs.

11. The network node of claim 10 wherein the optimization problem is:

$$\overline{\mathcal{P}}_t : \max_{p(t)} \sum_{i=1}^{N} \overline{\theta}_i(t) p_i(t) - \alpha(p_i(t) - p(t-1)^*)^2$$

s.t. $p_{i,min} \leq p_i(t) \leq p_{i,max}, \forall i \in \mathcal{N}$, $$\sum_{i=1}^{N} G_i p_i(t) \leq I_{max}^C, \text{ where}$$

$$\overline{\theta}_i(t) = \sum_{j \in \mathcal{J}_{t-D}} \frac{1}{P_j} \frac{\partial f_{j,t-D}(p(t-D))}{\partial p_i(t-D)} \bigg|_{p(t-D)=p(t-D)^*}$$

and:

$\overline{\mathcal{P}}_t$ denotes the optimization problem, $p_i(t)$ is a transmission power of a D2D transmitter of the i-th D2D pair for time slot t, $\alpha$ is a defined scaling factor, $p_{i,min}$ is a minimum transmission power of the D2D transmitter of the i-th D2D pair, $p_{i,max}$ is a maximum transmission power of the D2D transmitter of the i-th D2D pair, $\mathcal{N}$ is the set of i values for the plurality of D2D pairs, $G_i = \mathbb{E}[g_i(t)]$ where $g_i(t)$ is a channel gain from the D2D transmitter of the i-th D2D pair to the base station for time slot t, $I_{max}^c$ is a restraint on a maximum expected interference power from the plurality of D2D pairs to the base station, t–D is a starting time slot index, $\mathcal{J}_{t-D}$ is a set of indices of the limited subset of the plurality of D2D pairs;

$P_j = \sum_{j \in \mathcal{J}_i} \mathbb{P}_j$ where $\mathcal{J} \in \mathcal{J}_{t-D}$ and $\mathcal{J}_{t-D} = 1$, $p(t)^* = [p(t)^*]$ denotes an optimal solution to the optimization problem $\overline{\mathcal{P}}_t$ for all t, and $f_{j,t-D}(p(t-D)) = w_j \tilde{R}_{j,(t-D)}$, where $w_j$ is a weight assigned to the j-th D2D pair and:

$$\tilde{R}_{i,t} = \log\left(\sum_{j=1,j\neq i}^{N} p_j(t) h_{ij}(t) + I_i(t) + \Gamma p_i(t) h_{ii}(t)\right) - \log(I_i(t)) - \frac{\sum_{j=1,j\neq i}^{N} h_{ij}(t) p_j(t)}{I_i(t)}$$

where:

$h_{ij}(t)$ is a channel gain from a D2D transmitter of the j-th D2D pair to a D2D receiver of the i-th D2D pair in time slot t, $I_i(t)$ is a sum power of inter-cell interference, interference from the CUE, and noise received by the i-th D2D pair in time slot t, $\Gamma$ accounts for a gap between an actual data rate and the Shannon bound, and $h_{ii}(t)$ is a channel gain from a D2D transmitter of the i-th D2D pair to a D2D receiver of the i-th D2D pair in time slot t.

12. A network node that implements a power control coordinator for controlling transmission power of a plurality of Device-to-Device pairs that co-exist with a Cellular User Equipment (CUE) that communicates with a base station for a cellular communications network, the network node adapted to:

obtain, for a particular time slot, delayed Network State Information (NSI) feedback from at least some of a plurality of Device-to-Device (D2D) pairs;

compute transmission powers for the D2D pairs, respectively, for the particular time slot using On-Line Convex Optimization (OCO) to solve an optimization problem that maximizes a weighted sum data rate of D2D pairs with a constraint of maximum expected interference to the base station, wherein overall expected interference power from the plurality of the D2D pairs to the base station does not exceed a certain restraint value; and provide, to each D2D pair, an indication of the computed transmission power for the D2D pair for the particular time slot.

13. The method of claim 1 wherein:

the delayed NSI feedback includes information of a sum power of inter-cell interference, interference from the CUE, and noise received by the at least some of the plurality of D2D pairs in the particular time slot; and the computing transmission powers for the D2D pairs are based on the delayed NSI feedback.

\* \* \* \* \*